United States Patent Office 3,012,014
Patented Dec. 5, 1961

---

3,012,014
VULCANIZATION OF RUBBERS
Frank Woods, Preston, England, assignor to Polymer Corporation Limited, Sarnia, Ontario, Canada, a body corporate
No Drawing. Filed July 23, 1959, Ser. No. 828,958
3 Claims. (Cl. 260—79)

This invention relates to the vulcanization of rubbers and more particularly to the vulcanization of rubber at ordinary atmospheric temperatures.

Three usual methods of vulcanizing rubbers without the application of heat that are or have been employed in manufacture are as follows:

Extremely powerful accelerators of the normal sulphur vulcanization reaction, well known to those skilled in the art, are added to compositions of rubber and sulphur, usually dissolved in a suitable solvent. These powerful accelerators of vulcanization will bring about vulcanization without the application of heat, but the rubber compositions to which they are added must be dispersed in a solvent or non-solvent medium, otherwise mechanical working of the compound for shaping or fabrication purposes will cause premature vulcanization. Another method of vulcanization at ordinary temperatures is to treat thin sheets or articles of rubber with dilute solutions of sulphur monochloride ($S_2Cl_2$). This agent diffuses into the rubber and effects vulcanization. Again, thin sheets or articles of rubber are treated alternately with gaseous sulphur dioxide and hydrogen sulphide which precipitate nascent sulphur in the rubber resulting in vulcanization (Peachey Process).

The object of the present invention is to avoid the need for solution or dispersion of the rubber, the difficulties of technical control of the degree of vulcanization associated with the sulphur monochloride method, and the use of two gases.

According to the present invention there is provided a method of vulcanizing a polymeric material, such as rubber or like vulcanizable material, which method comprises intimately dispersing in the polymeric material a vulcanizing agent having the general formula

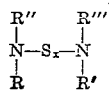

where R and R' are hydrogen or organic radicals, R" and R''' are organic radicals and $x$ has a value of 1, 2, 3 or 4, and thereafter immersing the rubber or like material in an acidic medium. The organic radicals may, for example, be alkyl, aryl, alkyl aryl or cycloalkyl radicals, and R and R" or R' and R''' may form part of a cyclic structure.

Preferably the vulcanizing agent is N,N'-dithiobismorpholine. However, the nature of the radicals R, R', R", or R''' is relatively unimportant in the carrying out of this invention, and the following vulcanizing agents are examples of many which could be employed:

N,N'-monothiobisdiethylamine
N,N'-dithiobisdiethylamine
N,N'-dithiobisethylamine
N,N'-dithiobispiperidine
N,N'-dithiobisbenzylamine
N,N'-dithiobispyrrolidine
N,N'-trithiobismorpholine
N,N'-tetrathiobismorpholine The method according to the present invention may be employed with a wide variety of proportions of the rubber or like material and the vulcanizing agent which will result in technically useful products, but in general 0.5 to 5.0 parts of the amine sulphide per hundred parts of polymeric material should give vulcanizates with a useful range of physical properties.

A suitable antioxidant may be added to the composition to improve its ageing properties.

The acidic medium may be an acidic gas or a liquid, and is preferably hydrochloric acid gas or a solution of hydrochloric acid. Preferably, the polymeric material and vulcanizing agent are dry mixed, vulcanization being effected by exposure of the mixture to hydrochloric acid gas.

There may be incorporated in the mixture of polymeric material and the vulcanizing agent any fillers, reinforcing agents, softeners, oils, waxes, extenders, or other compounding ingredients which may be required to produce desired properties in the finished article. Mixing may be effected by the usual methods well known to those skilled in the art, i.e. on internal or open two-roll mills, or by any other suitable method.

The rubber composition thus prepared may then be fabricated or shaped into sheet or other articles by, for example, sheeting, calendering, extruding, cutting, slicing, proofing, cementing. These articles are then placed in a chamber or vessel to which the acidic medium is admitted for a sufficient interval of time to give the desired degree of vulcanization. The acid gas or liquid, on diffusion into the rubber or like material, reacts with the above-mentioned vulcanizing agent giving rise to reaction products which vulcanize the rubber or like material. After vulcanization is completed, the article should be thoroughly washed with water or mild alkali to remove any soluble by-products of the reaction.

The invention is particularly applicable to the vulcanization of rubber or like goods without the use of elevated temperature, but it is to be understood that it is not limited thereto, and the process described may be applied at any temperature suitable to the composition employed.

The following examples illustrate the invention:

A mixture with the following composition was prepared by the usual method on a two-roll rubber mixing mill:

| | Parts by weight |
|---|---|
| Pale crepe rubber | 100 |
| N,N'-dithiobismorpholine | 2.5 |

From this mix a sheet approximately 0.1 inch thick was prepared, and a small portion of this was suspended in an ordinary glass laboratory desiccator so that its surface was exposed to the surrounding atmosphere. Hydrogen chloride from a generator was passed through the desiccator for a period of 24 hours, after which the rubber was removed and washed. The rubber when examined by the hand test was found to be very well vulcanized.

A further sheet 0.2 inch thick of the mixture described above was treated under identical conditions with hydrogen chloride for 24 hours. In this case the hydrogen chloride did not fully penetrate the rubber and although the faces of the sheet were well vulcanized the central portion of the sheet had not been affected. This sheet could be split on dissolving the unvulcanized portion by placing it in benzene.

Although the above examples refer in particular to a variety of natural rubber, it is to be understood that the method according to the present invention is not limited thereto and that the invention also applied to all sulphur vulcanizable forms of elastomers and high polymers, including for example, all grades of natural rubber (caoutchouc), gutta percha, balata, synthetic polyisoprenes, polybutadiene, copolymers of butadiene with styrene, acrylonitrile, methylmethacrylate and vinyl pyridine, or Butyl rubber.

The invention is further illustrated by the following test results on compositions according to the invention.

The test films on which data are reported were prepared by cold milling the compositions to form thin sheets. Films were prepared therefrom by placing the sheets between sheets of Teflon polytetrafluoroethylene backed with metal plates; the assembly was inserted between the moderately warm platens of a small press and pressure was exerted for an adequate period of time, e.g. three minutes or more, after which the heating of the platens was discontinued and cold water was circulated therethrough for ten minutes. On removal of the assembly from the press one side of the film was exposed while the Teflon was left in contact with the other side.

The resulting Teflon backed specimen was placed on the porcelain tray of a nine-litre desiccator and hydrogen chloride was introduced until the pressure was slightly in excess of atmospheric. Exposure periods of various durations were investigated. On expiration of the exposure periods the Teflon backing was removed from the specimen and it was washed with care in a mild solution of ammonium hydroxide. The specimen was then dried and subjected to Instron testing for stress-strain determinations.

The following tables set out data obtained from the samples treated in accordance with the invention. Where gum stocks are indicated, the compound contained polymer 100 parts and the indicated quantity of amine sulphide - N,N' - dithiobismorpholine. Where black compounds are indicated, it also contained 50 parts of NBS (furnace) black.

TABLE I

| Polymer | Compound | Parts amine sulphide | Exposure time (hrs.) | Rate of pull, in./minute | 300% modulus (p.s.i.) | Tensile strength (p.s.i.) | Percentage elongation |
|---|---|---|---|---|---|---|---|
| Natural rubber | Gum | 2 | 6 | 2 | 400 | 1,000 | 560 |
| | | | 20 | 2 | 200 | 840 | 780 |
| | Black | 1 | 16 | 20 | 550 | 1,270 | 550 |
| | | | 22 | 20 | 510 | 695 | 350 |
| | do | 1.5 | 18 | 2 | 520 | 1,425 | 530 |
| | Gum | 1.5 | 6 | 2 | 600 | 1,465 | 590 |
| Cis-polyisoprene | do | 1.5 | 10 | 20 | 615 | 1,750 | 610 |
| | do | 2 | 20 | 2 | 205 | 585 | 630 |
| | Black | 1 | 16 | 20 | 530 | 820 | 460 |
| | | | 22 | 20 | 490 | 625 | 400 |
| | do | 1.5 | 18 | 2 | | 800 | 230 |
| | do | 1.5 | 6 | 2 | | 830 | 270 |
| | do | 1.5 | 12 | 20 | | 720 | 230 |
| Butadiene-styrene copolymer | Black | 1 | 16 | 20 | 920 | 1,430 | 460 |
| | | | 22 | 20 | 1,025 | 1,500 | 430 |
| | do | 1.5 | 18 | 2 | 1,210 | 2,020 | 470 |
| | Gum | 1.5 | 6 | 2 | 1,360 | 1,900 | 460 |
| | do | 1.5 | 10 | 20 | 1,380 | 2,000 | 420 |
| Butyl | do | 2 | 20 | 2 | 105 | 415 | 170 |
| | Black | 1 | 16 | 20 | 130 | 285 | 700 |
| | | | 22 | 20 | 200 | 450 | 670 |
| | do | 1.5 | 18 | 20 | 135 | 175 | 530 |
| | Gum | 1.5 | 6 | 2 | 135 | 350 | 810 |
| | do | 1.5 | 12 | 20 | 110 | 475 | 770 |

TABLE II

*Butadiene-styrene (black) compounds*

2 HOURS' EXPOSURE

| Parts amine sulphide | Rate of pull in./minute | 300% modulus (p.s.i.) | Tensile strength (p.s.i.) | Percent elongation |
|---|---|---|---|---|
| 1.5 | 20 | 1,030 | 1,415 | 500 |
| 2.5 | 20 | 2,100 | 2,730 | 390 |
| 3.5 | 20 | 2,430 | 3,180 | 400 |
| 4.5 | 20 | 2,980 | 3,115 | 310 |

4 HOURS' EXPOSURE

| 1.5 | 20 | 1,070 | 1,445 | 420 |
| 2.5 | 20 | 2,680 | 3,390 | 390 |
| 3.5 | 20 | 3,020 | 3,750 | 400 |
| 4.5 | 20 | 3,400 | 3,950 | 350 |

6 HOURS' EXPOSURE

| 1.5 | 2 | 750 | 1,105 | 470 |
| 2.5 | 2 | 1,930 | 3,315 | 480 |
| 3.5 | 2 | 2,620 | 3,410 | 370 |
| 4.5 | 2 | 2,940 | 3,515 | 350 |

These data indicate that optimal tensiles are achieved in four hours' exposure and with 3.5 parts amine sulphide.

TABLE III

*Butyl rubber gum stocks*

4 HOURS' EXPOSURE

| Parts amine sulphide | Rate of pull in./minute | 300% modulus (p.s.i.) | Tensile strength (p.s.i.) | Percent elongation |
|---|---|---|---|---|
| 1.5 | 20 | 215 | 455 | 470 |
| 2.5 | 20 | 150 | 310 | 700 |
| 3.5 | 20 | 215 | 380 | 600 |
| 4.5 | 20 | 100 | 170 | 740 |

8 HOURS' EXPOSURE

| 1.5 | 20 | 172 | 410 | 820 |
| 2.5 | 20 | 230 | 595 | 740 |
| 3.5 | 20 | 195 | 385 | 640 |
| 4.5 | 20 | 160 | 265 | 580 |

TABLE IV

*Butyl*

16 HOURS' EXPOSURE 2.5 PARTS AMINE SULPHIDE

| Compound | Rate of pull in./minute | Thickness (inches) | 300% modulus (p.s.i.) | Tensile strength (p.s.i.) | Percent elongation |
|---|---|---|---|---|---|
| Gum | 20 | .01 | 150 | 720 | 740 |
| Black | 20 | .008 | 940 | 2,085 | 590 |
| Do | 20 | .01 | 860 | 1,960 | 620 |
| Do | 20 | .013 | 630 | 1,590 | 650 |
| Do | 20 | .015 | 545 | 1,345 | 660 |

16 HOURS' EXPOSURE 3.5 PARTS AMINE SULPHIDE

| Black | 20 | .007 | 850 | 2,010 | |
| Do | 20 | .011 | 545 | 1,360 | 610 |
| Do | 20 | .014 | 520 | 1,090 | 530 |
| Do | 20 | .018 | 335 | 1,780 | 570 |

As indicated in the tables the rate of travel of the lower clamp of the Instron tester was varied. It is normal to pull rubber compounds at 20 in./minute and plastic compounds at 2 in./minute.

The embodiments of the invention in which an exclusive property or privilege is claimed are defined as follows:

1. The method of vulcanizing a sulfur vulcanizable diene rubber which comprises intimately dispersing in said diene rubber N,N'-dithio bismorpholine in the ratio of from 0.5 to 5 parts per 100 parts by weight of said rubber and contacting the resulting dispersion with a hydrochloric acid medium to effect vulcanization thereof.

2. The method as set forth in claim 1 in which the dispersion is formed into a sheet prior to vulcanization thereof.

3. The method according to claim 2 in which the hydrochloric acid medium is gaseous.

References Cited in the file of this patent

UNITED STATES PATENTS

| | | |
|---|---|---|
| 2,490,518 | Hand | Dec. 6, 1949 |
| 2,747,005 | Zerbe | May 22, 1956 |
| 2,873,213 | Easton et al. | Feb. 10, 1959 |

OTHER REFERENCES

Le Bras: Rubber Fundamentals of Its Science and Technology, pages 144–145, Chem. Pub. Co., N.Y. (1957).